(12) United States Patent
Bosler et al.

(10) Patent No.: US 6,641,384 B2
(45) Date of Patent: Nov. 4, 2003

(54) APPARATUS FOR CONTINUOUS VACUUM FORMING BETWEEN A PAIR OF ROTATING BELTS

(75) Inventors: Kenneth Bosler, Holland, PA (US); Robert Bosler, Langhorne, PA (US); Ralph Bosler, Holland, PA (US)

(73) Assignee: Bosler Designs Inc., Warminster, PA (US)

( * ) Notice: Subject to any disclaimer, the term of this patent is extended or adjusted under 35 U.S.C. 154(b) by 0 days.

(21) Appl. No.: 10/021,484

(22) Filed: Oct. 29, 2001

(65) Prior Publication Data

US 2003/0080475 A1 May 1, 2003

(51) Int. Cl.$^7$ ................................................ B29C 41/28
(52) U.S. Cl. ............... 425/371; 425/388; 425/DIG. 44; 264/555
(58) Field of Search .............................. 425/388, 387.1, 425/394, 371, 224, DIG. 44; 264/555, 313, 172.19, 173.13, 511; 100/151, 153

(56) References Cited

U.S. PATENT DOCUMENTS

| 3,895,086 A | * | 7/1975 | Berner | 264/45.4 |
|---|---|---|---|---|
| 4,004,870 A | * | 1/1977 | Guttinger et al. | 425/224 |
| 4,128,369 A | | 12/1978 | Kemerer et al. | 425/113 |
| 4,290,248 A | | 9/1981 | Kemerer et al. | 264/167 |
| 5,167,781 A | | 12/1992 | Kemerer et al. | 264/166 |
| 5,314,325 A | * | 5/1994 | Bosler | 425/384 |
| 5,372,493 A | * | 12/1994 | Rodgers | 425/188 |
| 5,458,477 A | | 10/1995 | Kemerer et al. | 425/371 |
| 5,505,599 A | * | 4/1996 | Kemerer et al. | 425/4 C |
| 5,906,840 A | | 5/1999 | Bosler et al. | 425/388 |

* cited by examiner

Primary Examiner—Robert Davis
Assistant Examiner—Thu Khanh T. Nguyen
(74) Attorney, Agent, or Firm—Mathews, Collins, Shepherd & McKay, P.A.

(57) ABSTRACT

The present invention relates to an apparatus for continuous vacuum forming of a thermoplastic material between a pair of rotating flexible belts in which one belt includes a plurality of teeth, which are received in a plurality of indentations of the other belt. Each of the belts includes a mold, which forms a channel when the belts are adjacent to one another. A vacuum is applied to at least one of the flexible belts for drawing material received in the channel and alignment of the belts. Preferably, a vacuum can be applied to both of the belts for improved alignment. Each belt can include a plurality of apertures, which are in fluid flow communication with a plurality of perforations of a flat support belt positioned over a vacuum manifold.

4 Claims, 8 Drawing Sheets

APPARATUS FOR CONTINUOUS VACUUM FORMING BETWEEN A PAIR OF ROTATING BELTS

BACKGROUND OF THE INVENTION

1. Technical Field

The present invention relates to an apparatus for continuous vacuum forming of a thermoplastic material between a pair of rotating belts in which the belts maintain alignment to one another.

2. Description of the Related Art

Apparatus for continuous plastic molding between belt molds are known. U.S. Pat. Nos. 4,128,369 and 4,290,248 describe an apparatus in which a thermoplastic material is introduced between traveling flexible belt molds, which revolve in opposed relationships. A sheet metal belt travels in a mold channel. A flexible three-dimensional pattern is formed in a front face of the belt. Opposed nip rolls press the revolving belt molds against the thermoplastic material. Sixty or more small diameter rolls are used to maintain the two traveling mold surfaces in close contact.

U.S. Pat. Nos. 5,167,781 and 5,458,477 describe a continuous molding apparatus in which a pair of multi-ply woven endless fabric belts have silicone rubber outer mold adhered to a respective outer side of the fabric belts. A back-up plate is coated with a low friction material over which slides the continuously moving belt mold. These patents have the limitation of loss of alignment between belts or rollers during use.

U.S. Pat. No. 5,906,840 issued to the inventors of the present disclosure describes an apparatus for continuous vacuum forming a material in which a flexible material is continuously rotatable with a flat support belt. The flexible patterned belt has a patterned section along the length thereof and a pair of raised edge sections. The flexible belt and the support belt include perforations and a vacuum is in fluid flow with the perforations of the flexible belt and the perforations of the support belt to provide alignment of the flexible belt.

It is desirable to provide an apparatus for continuous vacuum forming between a pair of rotating belts having improved alignment of the belts.

SUMMARY OF THE INVENTION

The present invention relates to an apparatus for continuous vacuum forming of a thermoplastic material between a pair of rotating flexible belts in which one belt includes a plurality of teeth, which are received in a plurality of indentations of the other belt. Each of the belts includes a mold, which forms a channel when the belts are adjacent to one another. A vacuum is applied to at least one of the flexible belts for drawing material received in the channel and alignment of the belts. Preferably, a vacuum can be applied to both of the belts for improved alignment. Each belt can include a plurality of apertures, which are in fluid flow communication with a plurality of perforations of a flat support belt positioned over a vacuum manifold.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
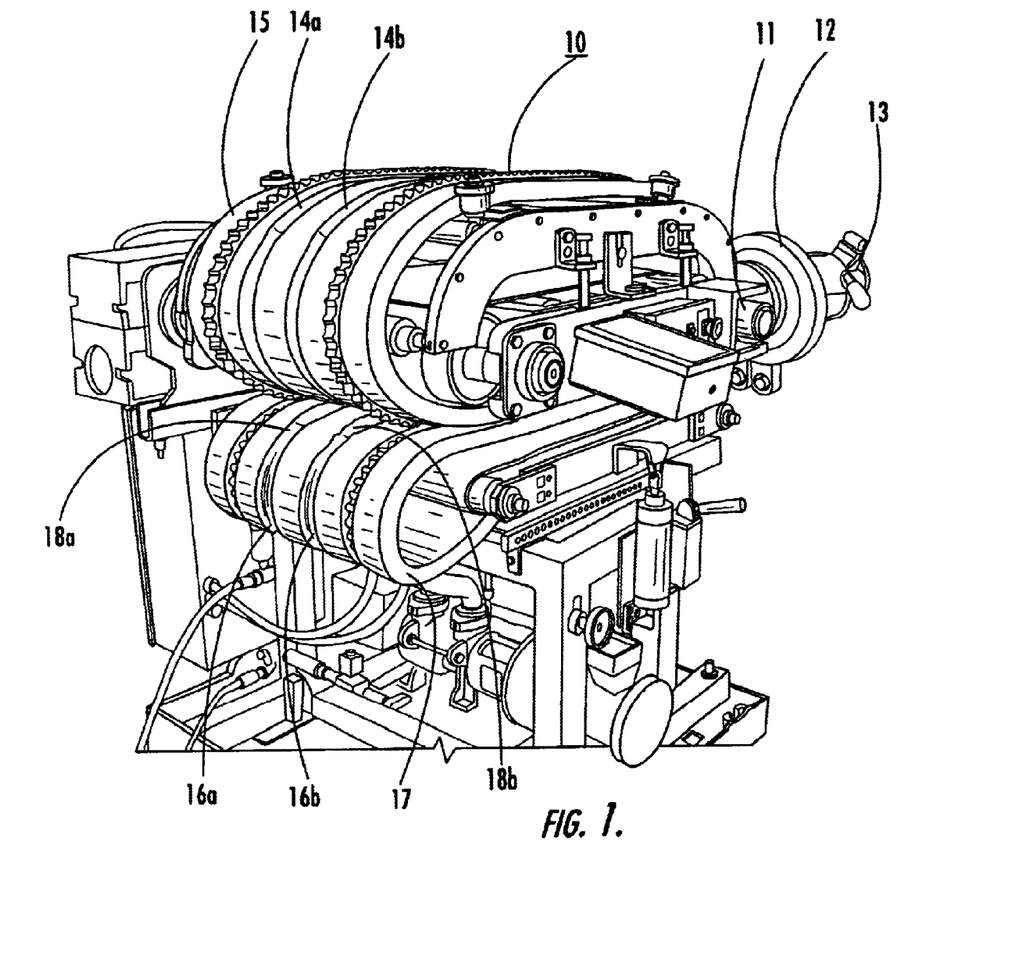
FIG. 1 is a side perspective view of a system for continuous vacuum forming between a pair of rotating belts in accordance with the teaching of the present invention.
Figure 2:
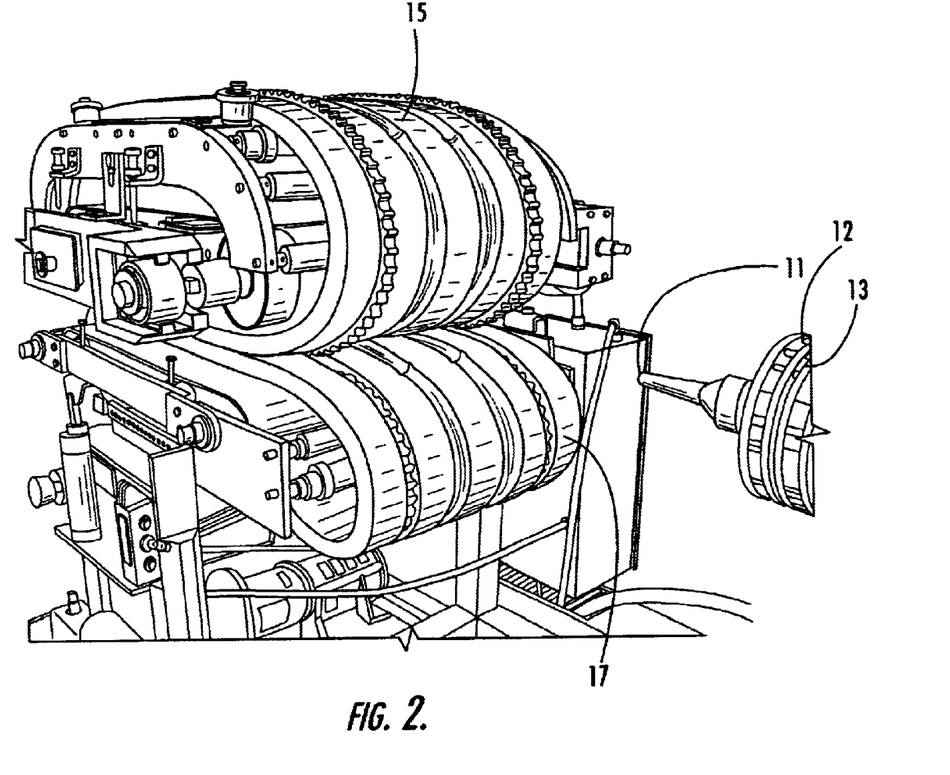
FIG. 2 is an end perspective view of a flexible molded belt and support belt of the present invention.
Figure 3:
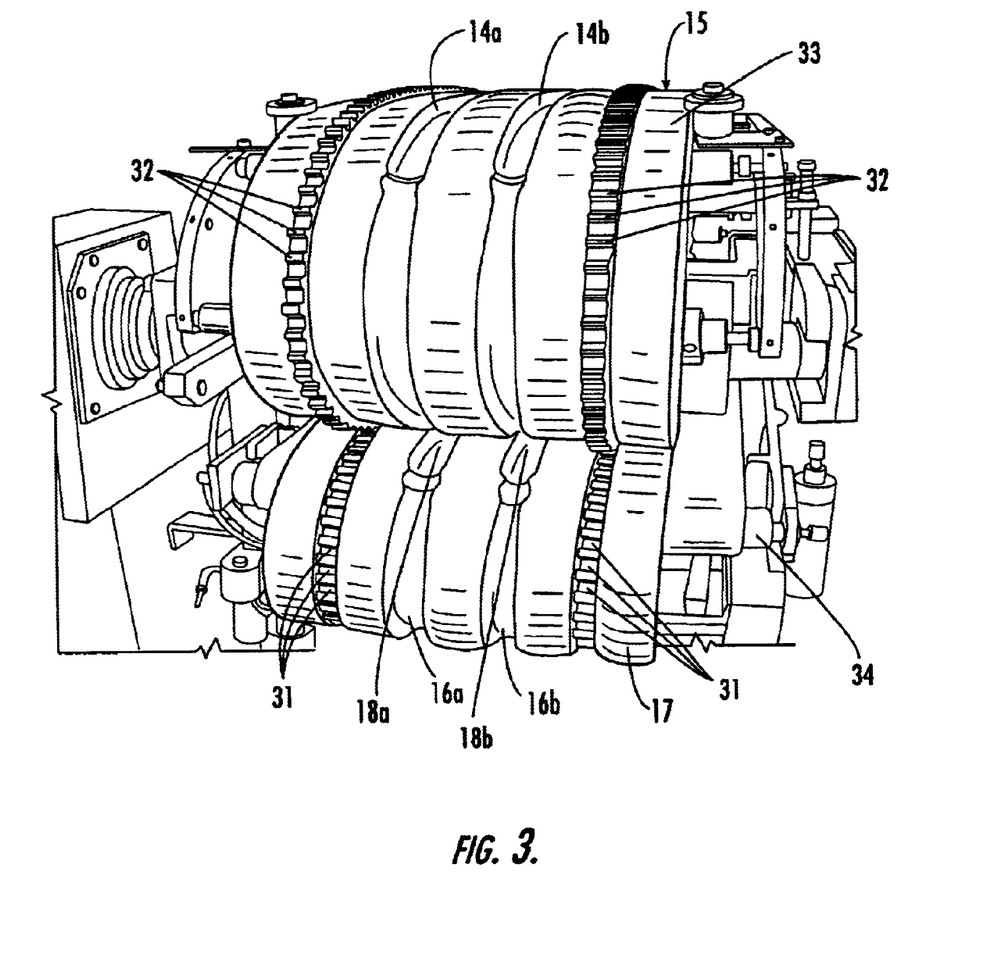
FIG. 3 is an end elevational view of the system of the present invention.

FIGS. 1 and 2 are perspective views of a system for continuous vacuum forming between a pair of rollers 10 in accordance with the teachings of the present invention. Extruded material 11 exits extruder feeding die 12 of extruder 13. Extruder feeding die 12 is positioned adjacent molds 14a and 14b formed in upper belt 15 and molds 16a and 16b formed in lower belt 17. Mold 14a and mold 16a forms channel 18a. When molds 14a and 16a are adjacent one another at area 19. Mold 14b and mold 16b forms channel 18b as shown in FIG. 3. Extruded material 11 is received in channels 18a and 18b and is formed and set to form shape 100 corresponding to a respective channels 18a and 18b, as shown in FIG. 4.

Extruded material 11 can be any thermoplastic material. For example, extruded material 11 can be formed of polyvinylchloride (PVC), polystyrene, acrylonitrile-butadiene-styrene (ABS), nylon, ethylene-vinyl acetate (EVA), polycarbonate, polyethylene, polypropylene, polyethylene terepathalate, thermoplastic olefins, acrylonitrile-styrene-acrylic (ASA), and alloys, blends or coextrusions of these resins. A preferred extruded material 11 is expandable (PVC) with cellulose reinforcement fibers. Suitable thermoplastic materials can include cellulose fibers, reinforcement elements, colorants, foamants, fillers and the like, which are compatible with the thermoplastic material and rotating channels 18a and 18b formed between upper belt 15 and lower belt 17.

Figure 4:
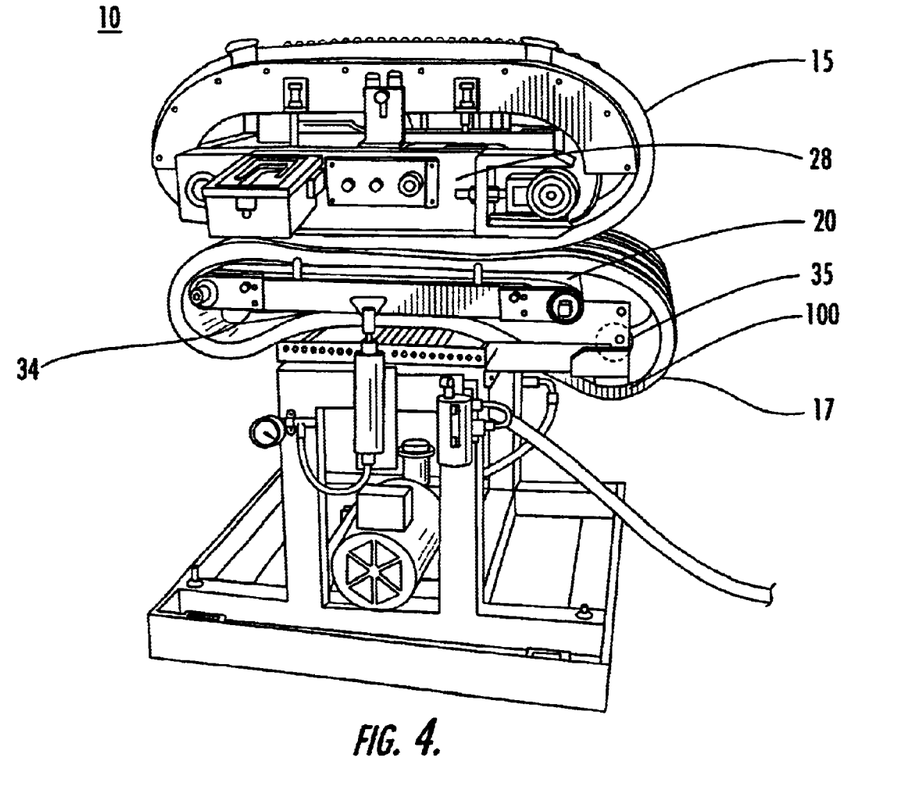
FIG. 4 is a side elevational view of the system of the present invention.
Figure 5:
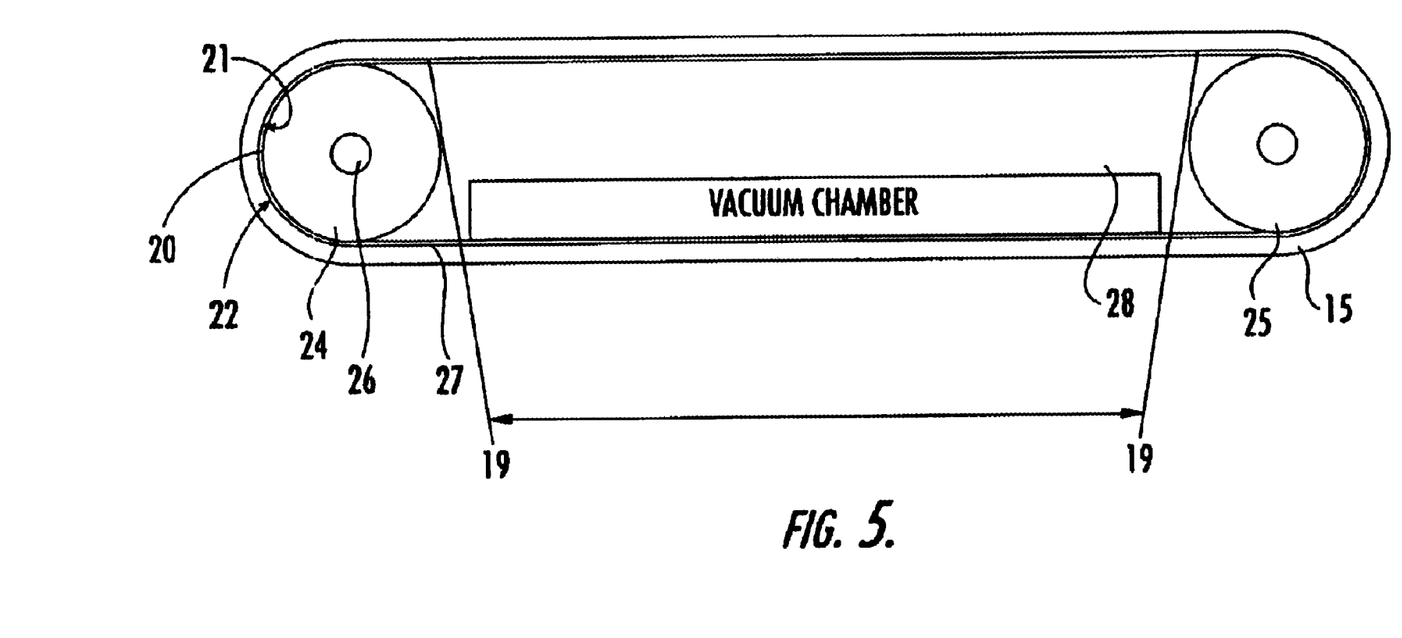
FIG. 5 is a side schematic view of the upper belt, including vacuum means.

Support belt 20 is positioned underneath upper belt 15 as shown in FIGS. 3, 4 and FIG. 5. Upper surface 21 of support belt 20 contacts lower surface 22 of upper belt 15. Upper belt 15 is and support belt 20 extend around rollers 24 and 25. Rollers 24 and 25 are driven by driving means 26 to make rolling contact with bottom surface 27 of support belt 20. Vacuum manifold 28 applies vacuum to area 19 between roller 24 and roller 25 to hold upper belt 15 against support belt 20. Support belt 20 is preferably formed of a flat perforated metal material. For example, metal materials useful for forming support belt 20 includes stainless steel, aluminum and nickel.

Outer surface of 30 lower belt 17 includes a plurality of indentations 31 for receiving corresponding teeth 32 extending from outer surface 33 of upper belt 15, as shown in FIG. 3. Lower belt 17 extends around rollers 34 and 35, as shown in FIG. 4. Rotation of upper belt 15 rotates lower belt 17 by continuous pulling of teeth 32.

Upper belt 15 and lower belt 17 are formed of a flexible material. For example, upper belt 15 and lower belt 17 can be formed of a rubber material, or rubberized material, such as silicone rubber.

Figure 6:
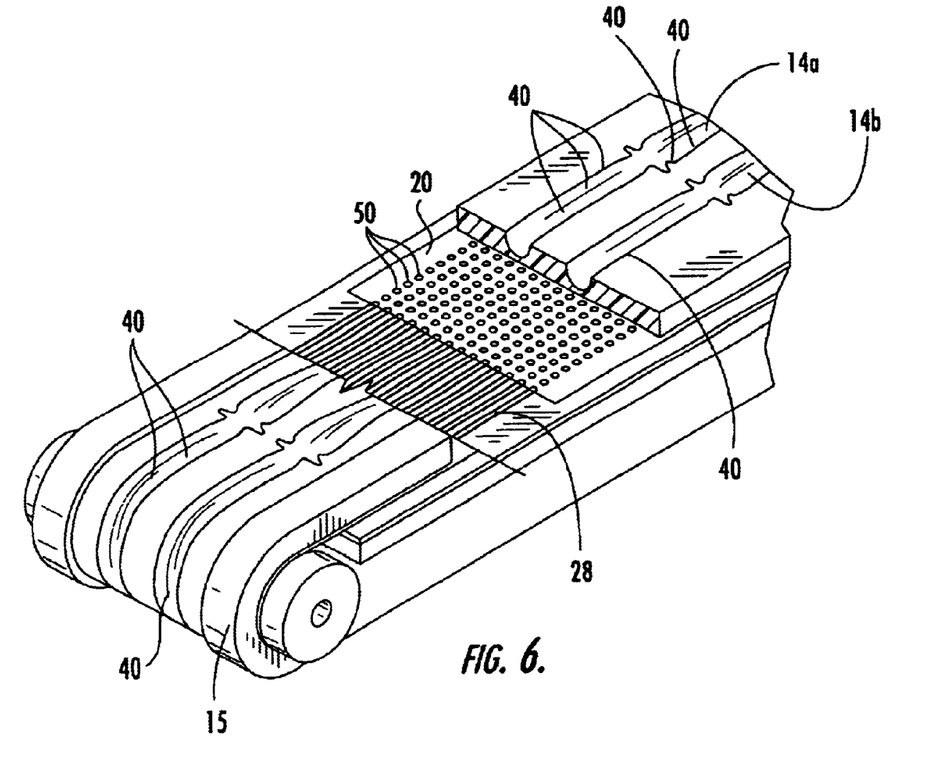
FIG. 6 is a top perspective view of the upper belt and support belt of the present invention.

Referring to FIG. 6, a plurality of apertures 40 can be formed in upper belt 15. Apertures 40 are preferably placed in inconspicuous locations in mold 14a mold and mold 14b, such that raised surface areas are not observable on the formed plasticized product. A plurality of perforations 50 can be formed in support belt 20. Apertures 40 are in fluid flow communication with perforations 50 to facilitate drawing of extruded material 11 into channels 18a and 18b by vacuum manifold 28. It will be appreciated that a suitable support belt and vacuum manifold is described in U.S. Pat. No. 5,906,890 the details of which are hereby incorporated by reference into this application.

Figure 7:
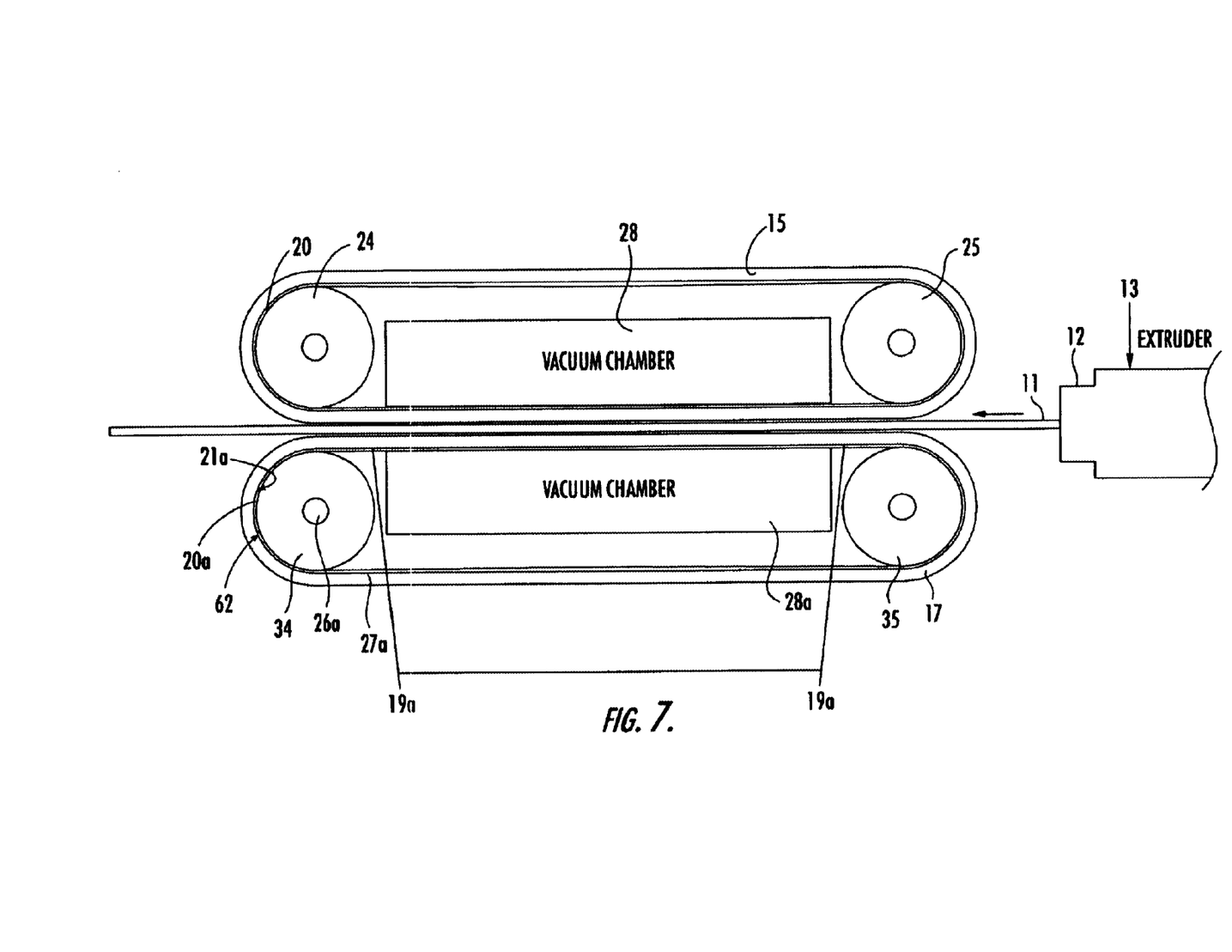
FIG. 7 is a side schematic diagram of the upper and lower belts each including vacuum means.
Figure 8:
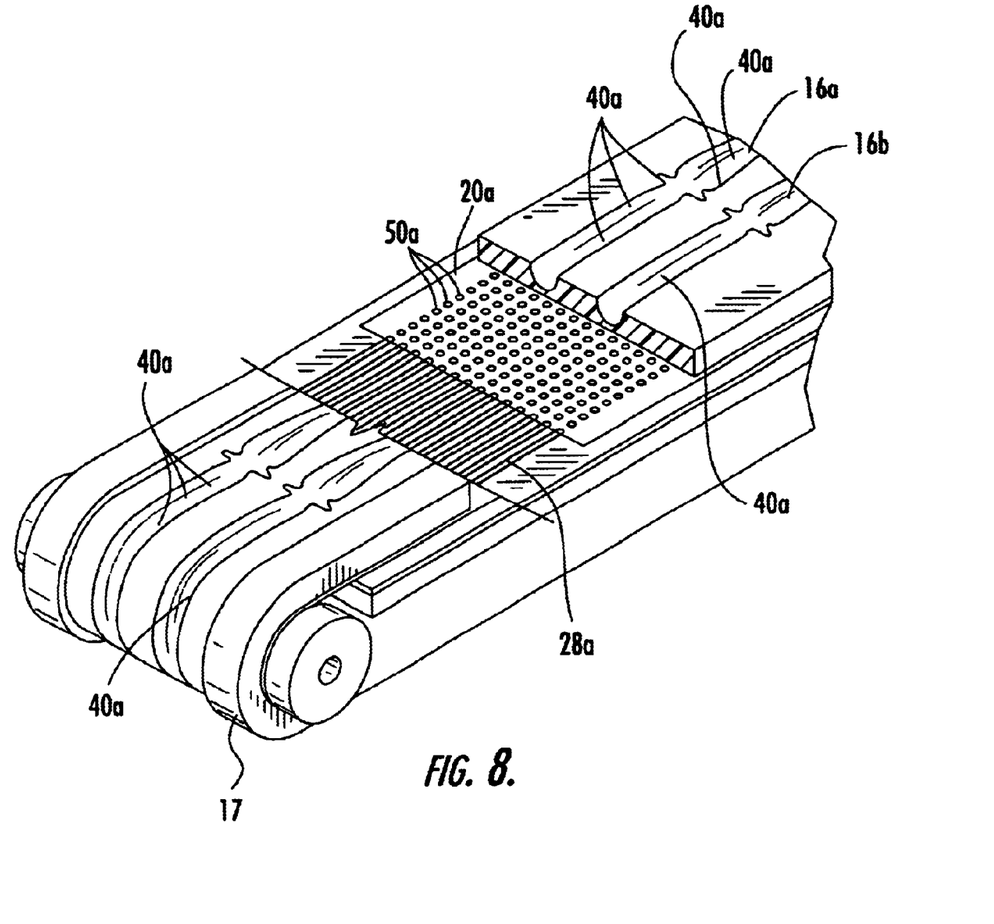
FIG. 8 is a top perspective view of the lower belt and support belt of the present invention.

In an alternative embodiment, a second support belt 20a is positioned underneath lower belt 17 as shown in FIG. 7. Upper surface 21a of support belt 20a contacts lower surface 62 of lower support belt 17. Support belt 20a extends around rollers 34 and 35. Rollers 34 and 35 are driven by driving means 26a to make rolling contact with bottom surface 27a of support belt 20a. A plurality of apertures 40a are formed in lower belt 17. A plurality of perforations 50a are formed in support belt 20a. Apertures 40a are in fluid flow communication with perforations 50a, as shown in FIG. 8. Vacuum manifold 28a applies vacuum to area 19a between roller 34 and roller 35 to hold lower belt 17 against support belt 20a. The application of vacuum to both upper belt 15 and lower belt 17 provides improved alignment of both upper belt 15 and lower belt 17.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. An apparatus for continuous vacuum forming comprising:

a first flexible belt having at least one mold therein, said first flexible belt being fitted over a first support belt rotating on a first pair of rollers;

a second flexible belt having at least one mold therein, said second flexible belt being fitted over a second support belt rotating on a second pair of rollers, each of said at least one mold of said first flexible belt and each of said at least one mold of said second flexible belt forming at least one channel, each of said at least one mold of said first flexible belt and each of said at least one mold of said second flexible belt are adjacent one another;

vacuum means positioned adjacent at least one of said first support belt or said second support belt;

a plurality of teeth being formed in said first flexible belt;

a plurality of indentations being formed in said second flexible belt, each of said teeth being received in one of said indentations, in which rotation of said first flexible belt rotates said second flexible belt by continuous pulling of said teeth and wherein said vacuum means provides drawing of a material received in said channel and said plurality of teeth received in respective said plurality of indentations provides alignment of said first flexible belt and said second flexible belt.

2. The apparatus of claim 1 wherein said vacuum means is positioned adjacent both said first support belt and said second support belt.

3. The apparatus of claim 1 wherein said first flexible belt and said second flexible belt are formed of a rubberized material.

4. The apparatus of claim 1 wherein said support belt includes a plurality of perforations and said at least one mold includes a plurality of apertures, said vacuum means is in fluid flow communication between said perforations of said support belt and said apertures of at least one mold.

* * * * *